United States Patent [19]

Dellinger

[11] Patent Number: 5,391,667
[45] Date of Patent: Feb. 21, 1995

[54] COPOLYMERS OF N-VINYL-LACTAMS SUITABLE FOR OLIGOMER SOLID PHASE SYNTHESIS

[75] Inventor: Douglas J. Dellinger, Cardiff by the Sea, Calif.

[73] Assignee: Isis Pharmaceuticals, Carlsbad, Calif.

[21] Appl. No.: 26,468

[22] Filed: Mar. 4, 1993

[51] Int. Cl.6 ............... C08F 226/10; C08F 212/36; C08F 214/02
[52] U.S. Cl. ................. 526/264; 526/310; 526/347.1; 526/293
[58] Field of Search ............ 526/264, 293, 310, 347.1

[56] References Cited

U.S. PATENT DOCUMENTS

| | | | |
|---|---|---|---|
| 4,373,071 | 2/1983 | Itakura | 525/375 |
| 4,401,796 | 8/1983 | Itakura | 525/340 |
| 4,507,433 | 3/1985 | Miller et al. | 525/54.11 |
| 4,638,032 | 1/1987 | Benner | 525/54.11 |
| 4,812,512 | 3/1989 | Buendia et al. | 525/54.11 |
| 4,908,405 | 3/1990 | Bayer et al. | 525/61 |
| 5,037,882 | 8/1991 | Steel | 525/54.11 |
| 5,106,730 | 4/1992 | Van Ness et al. | 435/6 |
| 5,206,322 | 4/1993 | Login et al. | 526/264 |

FOREIGN PATENT DOCUMENTS

| | | |
|---|---|---|
| 0289029 | 2/1988 | European Pat. Off. . |
| 0375278 | 6/1990 | European Pat. Off. . |
| WO92/0788 | 5/1992 | WIPO . |

OTHER PUBLICATIONS

Amarnath and Broom, "Chemical Synthesis of Oligonucleotides", *Chemical Reviews* 77:183–219 1977.
Haller, Wolfgang. "Application of Controlled Pore Glass in Solid Phase Biochemistry" *Chem. Anal.*, NY 11: 535–597 1983.
Knight and Merbach, "Mechanism of Dimethyl Sulfide Intermolecular Exchange and Trans-Cis Isomerization of $SnCl_4 \cdot 2Me_2S$. Variable-Pressure Proton NMR and Variable-Temperature Tin-119 Magnetization Transfer NMR Studies", *Inorg. Chem.* 24 576–581 1985.
Led and Gesmar, "The Applicability of the Magnetization-Transfer NMR Technique to Determine Chemical Exchange Rates in Extreme Cases. The Importance of Complementary Experiments", *J. Magn. Reson.* 49:444–463 1982.
Lieto, J. et al., "Polymeric Supports for Catalysts", *Chemtech.* 13(1):46–53 1983.
Pless and Letsinger, "Solid Support Synthesis of Oligothymidylates Using Phosphorochloridates and 1-alkylimidazoles", *Nucleic Acids Research* 2:773–786 1975.
Seliger and Aumann, "Oligonucleotide Synthesis on a Polymer Support Soluble in Water and Pyridine", *Tetrahedron Letts.* 31:2911–2914 1973.
Seliger and Aumann, "Trägersynthesen, 6*)", Die *Makromolekulare Chemie* 176:609–627 1975.
Seliger, H., "Handelsübliche Polymere als Träger in der Oligonucleotidsynthese, 1*)", *Die Makromolekulare Chemie*, 176:1611–1627 1975.

Primary Examiner—Joseph L. Schofer
Assistant Examiner—Wu C. Cheng
Attorney, Agent, or Firm—Woodcock Washburn Kurtz Mackiewicz & Norris

[57] ABSTRACT

Crosslinked copolymers of N-vinylpyrrolidone and other n-vinyl-lactam monomers and ethylenically unsaturated monomer having at least one amine or amine-displaceable functionality are utilized for oligomer synthesis. The oligomer of interest is connected to the polymer via a connection to an amine function. A spacer can be included between the amine function and the polymeric backbone.

20 Claims, No Drawings

COPOLYMERS OF N-VINYL-LACTAMS SUITABLE FOR OLIGOMER SOLID PHASE SYNTHESIS

FIELD OF THE INVENTION

This invention is directed to improved resin supports for oligomer synthesis. The resin supports are crosslinked copolymers of N-vinyl-lactams especially N-vinyl-2-pyrrolidone, and a further ethylenically unsaturated, polymerizable unit that contains or can be modified to contain an amine functional group.

BACKGROUND OF THE INVENTION

Solid phase support synthesis of oligomers such as polynucleotides, polypeptides, and polysaccharides is currently the synthetic method of choice. Solid phase support synthesis allows for efficient removal of reactants from a growing oligomer by simple washing excess reagent from the reaction product that is attached to the solid phase support. Additionally, synthesis on a solid phase support allows for semi-automation of the synthetic process.

Various solid supports have been studied for oligonucleotide synthesis. Early efforts were directed to organic resins, especially polystyrene resins. A review of these early efforts is found in Amarnath, V. and Broom, A. D., *Chemical Reviews*, 1977, 77:183-219. Later-developed styrene polymer supports include graft polymers disclosed in U.S. Pat. No. 4,908,405 to E. Bayer and W. Rapp. The graft polymers of Bayer and Rapp include graft polymers of polyoxyethylene and polyvinyl alcohol, polyhydroxy-styrene or chloromethylated polystyrene crosslinked with ethylene glycol, oligoethylene glycol, polyacrylate polymer, polymethacrylate polymer functionalized with hydroxy groups. These are noted as being of importance for peptide synthesis. The polyoxyethylene chains of such graft polymers are high molecular weight chains having molecular weights from 500 to 50,000.

In U.S. Pat. No. 4,373,071, K. Itakura describes the use of a polyacrylmorpholide support resin for oligonucleotide synthesis. The use of a polystyrene resin is also disclosed. Itakura compares the polystyrene resin to the polyacrylmorpholide resin and notes that the polystyrene resin is advantageous because it is not hydrophilic, i.e. "it has no problems of affinity to hydroxylic groups such as water, methanol and ethanol." In this patent and in U.S. Pat. No. 4,401,796 Itakura further describes a derivatized polystyrene resin. This derivatized resin is formed by treatment of chloromethyl-polystyrene with potassium phthalimide to form the corresponding phthalimido methyl resin. The phthalimido methyl styrene resin is then converted to an amino methyl styrene resin by treatment with hydrazine in ethanol. A 2'-deoxynucleotide is attached to the amino methyl styrene resin by activation of the nucleotide via treatment with succinic anhydride. The monosuccinate derivatized nucleotide is then treated with pentachlorophenol and dicyclohexylcarbodiimide in DMF to form an activated ester. The activated ester reacts with the amino methyl styrene resin to link the nucleotide to the amino functionality of the resin. The nucleotide-resin link is achieved by way of an succinyl amide linkage. Further use of an amino methyl styrene resin is described in U.S. Pat. No. 4,507,433 to P. S. Miller and P.O.P. Ts'O.

A process of functionalizing polystyrene to its amino methyl derivative is also described by Lieto, J., Milstein, D., Albright, R. L., Minkiewicz, J. V. and Gates, B. C., *Chemtech*, 1983, 13(1):46. The authors derivatize polystyrene via chloromethylation followed by amination of the chloromethyl compound with an amine. A primary amino group is introduced via derivatization with gaseous, anhydrous ammonia. Derivatization with secondary and tertiary amino moieties is also described.

In a first publication in 1973 (Seliger, H. and Aumann, G., *Tetrahedron Letts.*, 1973, 31:2911-2914) and in two subsequent publications in 1975 (Seliger, H. and Aumann, G., *Die Makromolekulare Chemie*, 1975 176:609-627 and Seliger, H., *Die Makromolekulare Chemie*, 1975 176:1611-1627), a copolymer of N-vinylpyrrolidone and vinylacetate is described. Post polymerization, the vinylacetate is hydrolyzed to vinyl alcohol. The vinyl alcohol-N-vinylpyrrolidone copolymer was then used for synthesis of thymidyl homopolymers. A thymidine nucleotide was attached to the hydroxyl group of the copolymer via reaction of a 5' chloroformate derivatized nucleotide. This results in nucleotide attachment via a carbonate linkage. The authors reported synthesis of a dimeric, trimeric, tetrameric and a pentameric homopolymer of thymidine. The reported overall yields of these short homopolymers were low; the pentamer was reported in 6% yield. No mixed oligonucleotides nor polymers larger than the pentamer were reported.

Inorganic supports have also been utilized for oligonucleotide solid-phase synthesis. These employ silicon base compounds as the structural support element. U.S. Pat. No. 4,812,512 suggests a derivatized form of Kieselguhr, i.e. silica gel, as well as derivatized forms of polytetrafluoroethylene, cellulose and metallic oxides. The Kieselguhr is appropriately treated to attach a linker thereon. The linker includes alkyl chains linked by ether, amide and/or sulfonamide moieties. The linker also includes a terminal amino group that is used as the attachment point for attaching a nucleotide to the support such as by utilizing succinic anhydride. The succinyl moiety connects between the nucleotide and the linker forming an ester linkage with the 3' hydroxyl group of the nucleotide and an amide linkage with terminal amine of the linker. Other silica based supports include Fractosil. These supports, however, can cause blockage of sintered glass funnels utilized during the synthetic cycle of an oligonucleotide synthesis. Furthermore, the non-uniform pore size of these supports can result in failure products.

Presently the most commonly utilized solid phase support material for use in oligonucleotide synthesis are the commercially available CPG (controlled pore glass) supports available from CPG Incorporated. Such controlled pore glass consists of uniformly milled and screened particles of almost pure silica that are hydrated under acidic conditions to produce particles with uniform pore size. Beads of a selected size are derivatized with a long chain having a terminal alkyl amine functionality. As described above for the silica gel support, succinic anhydride is used to attach a first nucleotide of the desired oligonucleotide sequence to the support.

CPG supports allow for the practice of synthetic chemistry based upon the published protocols of M. H. Cruthers and his associates. This chemistry utilizes tetrazole activated phosphoramidites as the reactive species for the synthesis. The procedure has been standardized to an extent that allows non-chemistry trained personal to operated commercial "synthesizers" such as those available from Applied Biosystems Inc., Foster City, Calif. Generally an ester group is utilized to attach the 3' hydroxyl group of the 3' terminal nucleotide of the oligonucleotide to the solid phase support. As described above this ester is generated from one of the two carbonyl groups of a succinyl moiety. The other carbonyl group of the succinyl moiety in turn is connected to the solid phase support via groups that are more stable than the ester such that when the oligonucleotide is removed from the solid phase support, cleavage of the oligonucleotide from the support occurs cleanly at the ester yielding a 3'-OH group on the 3' terminal nucleotide of the oligonucleotide.

CPG supports, however, are not without their problems. Loading is typically in the range of 30–50 μmol of oligonucleotide per gram of support due to limited surface area. While increasing the pore size increases surface area, the resulting support is brittle, crushing easily and clogging frits during synthesis. A polystyrene/polyoxyethylene graft polymer as described above was shown to have a loading capacity of 150–200 μmol/gram. Other Merrifield resins can have up to 1000 μmol/gram loading. It is evident that the CPG supports exhibit limited loading when compared to other support systems. Because of this limited loading, for large scale synthesis on CPG support, cost become a major concern since the price of this support is typically in the range of about $50,000.00 per kilogram of support.

Because it contains silicon atoms, CPG is highly hydrated and is hydrophilic. Solid-phase phosphite oligonucleotide synthesis utilizes phosphoramidites as the active species for phosphitylation. These phosphoramidites are easily hydrolyzed and thus deactivated. The oxidization step during an oligonucleotide cycle introduces water. Additionally atmospheric moisture can be absorbed in solvents or vacuumed through the reaction vessels. After the oxidization step, capping is practiced. Excess capping reagent (an anhydride) is used to theoretically scavenge any residual water from the oxidization step. Even though extreme care is taken to attempt to completely remove all water after the oxidization, the kinetic barrier to removal of all the water from the CPG support is difficult to overcome and water is retained on the CPG support. This thus requires that a large (up to 20 fold) excess of the phosphoramidites be used for each nucleotide added to an oligonucleotide. Since the phosphoramidate reagents are also very expensive, this further serves to increase the cost of effecting large scale oligonucleotide synthesis on CPG support.

Other problems are also encountered with CPG supports. Certain of these are reviewed in European Patent application 0 375 278. This patent suggests using non-swellable porous polystyrene supports to circumvent the problems associated with CPG supports. Such non-swellable porous polystyrene achieves it non-swellable characteristics by virtue of being an insoluble polymer.

Kinetic considerations favor solution phase reactions over solid phase reactions since with a solid phase reaction, a highly ordered layer of solvent becomes bound to the surface of the solid phase that inhibits free diffusion to target molecules bound to the solid support. This bound phase essentially encapsulates target molecules on the surface of the solid phase supports. Reagents must traverse through this bound phase to react with target molecules attached to the surface of the solid phase. In solution phase reactions, the target molecules are generally less encapsulated with bound solvent.

Soluble polymers behave much like solution phase reactions. Compared to insoluble polymers they do not exhibit as great a layer of bound solvent as do insoluble polymers. However, non-swelling polymers have reduced loading capacity. Furthermore, depending upon the composition of the polymer, soluble polymers however can exhibit different degrees of swelling in different solvents. Since many synthetic reaction schemes, including those utilized for solid phase oligonucleotide synthesis, require the use of various solvents throughout the synthetic scheme, unequal swelling of the polymer support during different parts of the synthetic cycle can result in variability between synthetic cycles or loss of yield.

Thus, a polymer which optimizes swelling, giving increased loading, while limiting solvent layering, and equalizing swelling between different solvents is greatly desired.

OBJECTS OF THE INVENTION

It is an object of this invention to provide new and improved solid phase supports for oligomer synthesis.

It is a further object of this invention to provide new and improved solid phase supports for oligonucleotide synthesis.

It is an additional object of this invention to provide solid phase supports that incorporate hydrophilic, non-nucleophilic components.

It is yet another object of this invention to provide polymers that incorporate N-vinylpyrrolidone as a co-monomer of polymer supports.

BRIEF DESCRIPTION OF THE INVENTION

In accordance with this invention, there are provided solid supports for oligomer synthesis having free amine functionalities comprising a polymerized blend of from about 10 to about 90 percent by weight of N-vinyl-lactam, from about 10 to about 90 percent by weight of ethylenically unsaturated monomer having at least one amine or amine-displaceable functionality, and from about 0.01 to about 5 percent by weight of di- or polyfunctional crosslinking agent.

In preferred embodiments of the invention, the ethylenically unsaturated monomer comprises $NH_2$ or a primary amine linked to an ethylene group via a spacing moiety, said spacing moiety comprising at least one of alkyl, aryl, ether, aralkyl, amide, sulfonamide, carbamate, urea, secondary or tertiary amine or dialkylsilane. Preferred ethylenically unsaturated monomers include N-(amino-$C_1$-$C_{10}$-alkyl)acrylamide, N-(amino-$C_1$-$C_{10}$-alkyl)-$C_1$-$C_{10}$-alkylacrylamide, N-$C_1$-$C_{10}$-alkylamino-$C_1$-$C_{10}$-alkyl) acrylamide, N-($C_1$-$C_{10}$-alkylamino-$C_1$-$C_{10}$-alkyl)-$C_1$-$C_{10}$-alkylacrylamide, $C_1$-$C_{10}$-alkylamino-$C_1$-$C_{10}$-alkylstyrene, amino-$C_1$-$C_{10}$-alkylstyrene, vinyl-$C_1$-$C_{10}$-alkylamine or vinyl-$C_1$-$C_{10}$-alkyl($C_1$-$C_{10}$-alkylamine).

In preferred embodiments of the invention the N-vinyl-lactam is N-vinylpropiolactam, N-vinyl-2-pyrrolidone (N-vinylbutyrolactam), N-vinyl-2-piperidone (N-vinylvalerolactam) or N-vinylcaprolactam. Most preferred is N-vinyl-2-pyrrolidone.

Further in accordance with the invention there are provided copolymers including copolymers of N-vinylpyrrolidone and N-phthalimidomethylacrylamide, copolymers of N-vinylpyrrolidone and N-phthalimidomethylacrylamide, copolymers of N-vinylpyrrolidone and chloromethylstyrene, and copolymers of N-vinylpyrrolidone and aminomethylstyrene, each of which is crosslinked via a crosslinking agent. Preferred crosslinking include divinylbenzene and divinylether.

Solid supports of the present invention are useful for the synthesis of polynucleotides such as polynucleotides having a predetermined sequence by providing crosslinked copolymer supports of the present invention and providing a 5'-blocked protected nucleoside having a 3'-hydroxyl and 5'-hydroxyl, the 5' blocked protected nucleoside being attached to the support. The 5'-blocked protected nucleoside forms a protected correct-sequence chain of a predetermined sequence. The 5'-hydroxyl of the correct-sequence chain is then deblocked. Thereafter, the 5'-hydroxyl of the correct-sequence chain is reacted with a 5'-blocked protected nucleoside monomer to form either a protected correct-sequence chain or a failure sequence, the failure sequence having a 5'-hydroxyl. These steps are repeated until the polynucleotide of the predetermined sequence is obtained. Thereafter the polynucleotide is cleaved from the support to form a cleavage mixture. Other oligomers such as polynucleotides and polysaccharides may also be similarly synthesized using solid supports of the present invention.

DETAILED DESCRIPTION OF THE INVENTION

Solid phase oligomer syntheses, including oligonucleotide synthesis, utilize various solvents throughout the synthetic cycle. To provide for rapid diffusion of reagents and solvents through a support matrix, if the support is totally insoluble and does not exhibit any swelling it must have an open pore structure to provide pathways for solvents and reagents. For supports that are partially soluble, the support should exhibit consistent swelling between each of the solvents utilized for synthesis. Indeed the poor swelling properties of the early polystyrene polymers contributed to the development of the silica based, insoluble, open pore supports including the CPG type supports.

In addition to it swelling properties, it is also considered advantageous in solid phase oligomer synthesis to use a support that minimizes barrier layer diffusion. A barrier layer is created by an ordering of solvent molecules on the surface of a solid phase support. Since this barrier layer is composed of ordered molecules, it is difficult to get consistent reagent diffusion across such a barrier to the molecules of interest which are attached to the solid phase support.

Modern graft polymers, unlike silica supports, are not highly hydrated, however, like CPG supports, these modern graft polymers are expensive to manufacture. While it is desirable to reduce water retention on the solid phase support, it is also desirable for supports utilized in oligomer synthesis to have a certain degree of hydrophilic character to facilitate solvation of polar reagents and the molecule being synthesized on the support. Neither the polystyrene portion nor the polyoxyethylene portion of the modern graft polymers add substantially to the hydrophilic characteristics of the support. Barrier layer formation also has been a problem with such graft polymer supports.

However, in accordance with this invention, it has been found that by creating a polymeric support having both hydrophilic and hydrophobic characteristics, the tendency to form a barrier layer is diminished. Hydrophilicity however, is normally associated with nucleophilicity. During oligomer synthesis, to prevent the solid phase support from reacting with electrophilic synthons, the solid phase support must not contain reactive nucleophilic groups such as free OH, $NH_2$ and the like. The present supports satisfy this requirement. While amine groups are provided on the supports of the invention for attachment of "starting" elements of oligomers, unused amine groups can easily be blocked to limit the nucleophilic character of the support after such attachment.

This invention is directed to certain copolymers that are usable as supports for solid phase synthesis and that have certain desirable properties for use during oligomer synthesis thereon. Specifically, solid supports of the present invention have free amine functionalities useful for linkage of molecules to the solid support. Included as one of the monomers of copolymers of the invention is a N-vinyl-lactam such as N-vinylpyrrolidone. N-vinyl-lactams have been found to contribute hydrophilic characteristics to a support polymer without contributing nucleophilicity. Such N-vinyl-lactams include N-vinylpropiolactam, N-vinyl-2-pyrrolidone (N-vinylbutyrolactam), N-vinyl-2-piperidone (N-vinylvalerolactam) and N-vinylcaprolactam. Preferred for use as the N-vinyl-lactam is N-vinyl-2-pyrrolidone.

In accordance with the invention, the N-vinyl-lactam thus serves as a hydrophilic moiety within the polymer support but since it is non-nucleophilic, it does not enter in to reactions with the reagents utilized for oligomer synthesis. The N-vinyl-lactam, however, preferably does not contain any derivatizable sites for attachment of a molecule of interest. Thus, by itself a N-vinyl-lactam will not serve as a support for oligomer solid phase synthesis.

By selecting a N-vinyl-lactam such as N-vinylpyrrolidone as a monomer and copolymerizing the N-vinylpyrrolidone with a second monomer species wherein the second monomer species includes an amine or amine-displaceable functionality thereon, a molecule of interest can be attached to the polymer support via an amine functionality retaining good solvation properties coupled with other beneficial properties of the support. In addition to the amine functionality, the second monomer species also preferably includes a functional moiety for copolymerization with N-vinyl-lactam. For polymerization, the second monomer species of the polymers of this invention utilize enthylenically unsaturated moieties as the polymerization moiety. Therefore, the second monomer species preferably include an ethylenically unsaturated monomer having at least one amine or amine-displaceable functionality. In preferred embodiments, the second monomer species further includes a "spacing moiety" for attaching the amine or amine displaceable moiety to the ethylenically unsaturated monomer.

The solid supports of the invention further preferably include a crosslinking agent for crosslinking the polymer in a matrix suitable for use as a solid phase support for oligomer synthesis thereon. Such oligomer synthesis can include synthesis of oligomers or chains of chemically similar subunits linked together such as polypeptides, polynucleotides or oligonucleotides and polysaccharides. The solid phase supports of the invention are particularly useful for solid phase oligonucleotide synthesis. The present invention is distinguished from the N-vinylpyrrolidone containing polymer support of Seliger, discussed above, in that supports of the present invention include one or more amine or amine displaceable functionalities linked to an ethylenically unsaturated monomer. The linkage of the molecule of interest, e.g. a nucleotide, amino acid, or monosaccharides, to the polymer support is through these amine functionalities. Such amine functionalities are absent in the polymer of Seliger. Further in preferred embodiments of the polymer supports of the present invention, the amine functionality is linked to the ethylenically unsaturated monomer via a spacing moiety and not directly to the polymeric backbone. Thus for oligonucleotide synthesis, the covalent bond between the first nucleotide and the polymer is spaced from the polymer backbone by the spacing moiety. This is in direct contrast to the supports of Seliger wherein the nucleotide is spaced from the backbone by only a single oxygen atom, i.e. the oxygen atom of the vinyl alcohol component of the polymer. In the Seliger polymer, attachment directly to the vinyl alcohol positions the attached molecule of interest in close proximity with the polymer backbone.

In one preferred embodiment of this invention the ethylenically unsaturated monomer comprises a polystyrene unit having an amine or amine-displaceable functionality attachment site thereon. In a further preferred embodiment of the invention the ethylenically unsaturated monomer comprises an acrylamide unit having an amine or amine-displaceable functionality attachment site thereon. In these embodiments of the invention, either a styrene, an acrylamide or a methacrylamide monomer are copolymerized with the N-vinyl-lactam monomer to form the polymeric backbone. Crosslinking is effected with a di- or polyfunctional crosslinking agent to complete a polymeric matrix.

For attaching a molecule of interest to the support, the styrene, acrylamide or methacrylamide are derivatized to incorporate the amine or amine-displaceable functionality directly thereon or the amine or amine-displaceable functionality is attached though a spacing moiety. The spacing moiety fixes the attached amine or amine-displaceable functionality distal to either the styrene or the acrylamide.

Crosslinking increases the molecular weight of the polymer. Various di- and polyfunctional crosslinking agents are available. These include divinylbenzene, 1,4-divinylether, 1,6-divinylether, trimetholol trimethylacrylate. Alpha-omega alkyl compounds may also be useful as crosslinking agents in some aspects of the invention. Other crosslinking agents are known including an extensive number of crosslinking agents commercially available for Polysciences, Inc., Warrington, Pa. Crosslinking can be effected to various degrees, however, as the crosslinking increases the loading decrease. Crosslinking can be effected in amounts from about 0.01% to about 5%. Crosslinking between about 0.2% to about 4% is preferred.

In preferred embodiments of the invention, the ratio of the N-vinyl-lactam monomer such as N-vinylpyrrolidone, to the ethylenically unsaturated monomer, i.e. a styrene or acrylamide moiety, can vary depending upon desired loading and swelling parameters. In preferred polymers of the invention the ratio of the N-vinyl-lactam monomer to the ethylenically unsaturated monomer is varied from 90:10 to 10:90. Polymers have been prepared wherein both the ratio of the N-vinyl-lactam monomer and the ethylenically unsaturated monomer has been varied as has the degree of crosslinking. These polymers have been characterized for both loading and swelling. These results are shown in the examples below.

Each of the ethylenically unsaturated monomers of the polymers of the invention include or are derivatized to include an amino or amino-displaceable functionality thereon. For preferred embodiments of the invention that utilize styrene or acrylamide, the amine or amine-displaceable functionality will connected to the styrene, acrylamide or methacrylamide via a spacing moiety. Spacing moieties preferably comprise at least one of alkyl, aryl, ether, aralkyl, amide, sulfonamide, carbamate, urea, secondary or tertiary amine and dialkysilane groups. Preferred alkyl groups are $C_1$-$C_{20}$ alkyl and aryl groups including methyl, ethyl, propyl, butyl, pentyl, hexyl, heptyl, octyl, nonyl and decyl. Preferred aralkyl groups are $C_7$-$C_{20}$ aralkyl. Preferred ether, amide, sulfonamide, carbamate, urea, amine and silane groups include ethers, amides, sufonamides, carbamates, ureas, amines and silanes of the preferred alkyl and aralkyl groups. Most preferred for the spacing moiety are the $C_1$-$C_{10}$ alkyl groups.

Other spacing moieties can include further functional groups that are non-nucleophilic and are more stable than an ester towards reagents utilized for oligomer synthesis. The ester stability is selected since an ester (normally a succinate) is generally utilized as the cleavable connection for attachment of the first nucleotide of an oligonucleotide to solid phase supports of the invention. Aside from an ester, amides may also be used as the cleavable connector for the first nucleotide to the support. Because amides are generally more stable than esters to the reagents utilized for oligonucleotide synthesis, stability of the connector, as judged by stability to the oligonucleotide synthetic reagents, is based upon the ester group.

Because an ester linkage is normally used to attach the first nucleotide of an oligonucleotide to the solid phase support, it is also preferred that the spacer not include other ester groups. If other ester linkages are present, then the reagents utilized for removing the oligonucleotide from the support upon completion of the synthesis may cleave such other ester groups and in doing so may leave portions of the spacer group still attached to the oligonucleotide. This, of course, will result in contamination of the oligonucleotide.

Specifically excluded as a functional group within the spacer or as the connector of the first nucleotide to the remainder of the support are carbonate groups. The carbonate moiety is excluded since it is less stable than an ester moiety to reagents utilized in oligonucleotide synthesis as well as being less stable to contaminates (mainly bases) that may be in solvents utilized in oligonucleotide synthesis.

Among the groups suitable for inclusion as functional groups in the spacing moiety are amides, carbamates, ethers, sulfonamides, ureas, secondary and tertiary amines and dialkysilanes since these functional groups are more stable than esters to the reagents used in oligonucleotide synthesis. In addition to these specific groups, essentially any other functional group that is stable to transesterification, ester hydrolysis or ester ammonolysis will be useful as a part of the spacing moiety. Linking structures and groups as are described in the above referenced U.S. Pat. Nos. 4,373,071, 4,401,796 and 4,812,512 are suitable for inclusion in spacing moieties of the invention. These patents are herein incorporated by reference in their entirety.

When styrene or another unsaturated benzene is utilized as the ethylenically unsaturated monomer of the polymer support, it is particularly useful to link the amine or amine-dispaceable functionality to the benzene moiety of the polystyrene using ethers and alkyl spacing moieties. For an ether linkage, p-acetylpolystyrene can be polymerized with a N-vinyl-lactam monomer such as N-vinylpyrrolidone. Post polymerization, the p-acetylpolystyrene is then hydrolyzed to the phenol analogue. This phenol analogue is then reacted with a bromoalkylphthalimide compound to alkylate the phenol to an ether. Treatment of this ether with hydrazine converts the phthalimide moiety to an amine. This amine is then available for use to couple a first nucleotide on the resin for initiation of oligonucleotide synthesis. For the purposes of this specification, the phthalimido group can be treated as a blocked amine.

For an alkyl spacing moiety, polystyrene is polymerized with the N-vinyl-lactam monomer. Post polymerization, the styrene is chloromethylated with chloromethylmethylether and $SnCl_4$ as per the procedures of Lieto et al., supra. The amine-displaceable chloro group is then displaced with the amine of choice, either ammonia for a primary amino functionality or with a primary amine for a secondary amino functionality. The displacement reaction is also conducted as per the procedures of Lieto et al., supra. For the purposes of this specification, chloro and other halo and as well as other groups displaceable by amines can be considered as amine precursors or amine-displaceable functionalities.

When acrylamide or methacrylamide is utilized as an ethylenically unsaturated monomer of the polymer support, particularly useful as a spacing moiety between the amine or amine-displaceable functionality and the amide nitrogen moiety of the acrylamide or methacrylamide are alkyl groups. Monomers or protected monomers of N-alkyl acrylamide are commercially available such as N-(3-aminopropyl)methacrylamide and N-phthalimidomethylacrylamide (both available form Polysciences, Inc., Warrington, Pa).

N-Vinyl-lactams of the invention include but are not limited to N-vinylpropiolactam, N-vinylpyrrolidone (N-vinylbutyrolactam), N-vinylpiperidone (N-vinylvalerolactam) and N-vinylcaprolactam. Such lactams are prepared as per the commercial preparation of N-vinyl-2-pyrrolidone wherein the corresponding lactone is reacted with ammonia to give the lactam followed by reaction with acetylene to give the corresponding N-vinyl-lactam. Thus in this commercial process 7-butyrolactone (such as prepared via the Reppe process) is reacted with ammonia followed by acetylene to give the N-vinylbutyrolactam, i.e., N-vinyl-2-pyrrolidone. In a like manner propiolactone, valerolactone or caprolactone are reacted with ammonia to give the corresponding lactams. Certain of these lactams are available commercially from GAF Chemical Corporation, Wayne, N.J. or Aldrich Chemical Co., Milwaukee, Wis. The lactams are then reacted with acetylene to give the corresponding N-vinyl-lactams. Various other useful lactams are disclosed in U.S. Pat. No. 5,106,730, incorporated herein by reference.

The preferred physical form of the solid phase supports of the invention is in the form of beads. These beads are preferable in a size range of from 40 μm to 400 μm. Most oligonucleotide synthesizers utilize sintered glass funnels of medium porosity (of a pore diameter of about 20 μm) to retain the solid phase support in the reaction chamber. If the beads are less than 40 μm then the possibility exist that such beads will block the surface of the sintered glass funnel.

For certain oligonucleotide synthesis, copolymers of N-vinylpyrrolidone and acrylamide or methacrylamide are preferred. Oligonucleotide synthesis normally includes the use of the trityl group, its various methoxy derivatives (generally dimethoxytrityl) or other aromatic groups as 5'-hydroxyl protecting groups. The trityl moiety is utilized to protect the 5'- hydroxyl group during coupling of an activated nucleotide to a growing oligonucleotide. Upon completion of the cycle coupling a particular nucleotide to the growing oligonucleotide, that nucleotide's trityl blocking group is remove to expose that nucleotide's 5'-hydroxyl moiety. The 5'-hydroxyl moiety is then available as the attachment site for the next round of nucleotide coupling to the growing oligonucleotide.

The trityl moiety is cleaved via an acid treatment. This is an equilibrium reaction. A trityl cation is generated upon trityl cleavage. Since it is an equilibrium reaction, if the trityl cation that is generated is not removed from the environment of the hydroxyl site, it will re-react with the hydroxyl group. This results in re-tritylation of the hydroxyl group.

Trityl cation removal is effected by diffusing the trityl cation away from the hydroxyl site and/or by reaction of the trityl cation with a quenching agent such as pyrrole. Trityl removal is normally done by using an acid wash. In large scale oligonucleotide synthesis, as the bed volume of the solid phase support increases, the more likely re-tritylation can occur. Thus with larger bed volumes, greater amounts of acid wash must be used.

The trityl group however has a great affinity for polystyrene since both styrene and trityl moieties include aromatic rings. This property was noted by Pless, R. C. and Letsinger, R. L., *Nucleic Acids Research,* 1975 2:773 for a polystyrene support. During oligonucleotide synthesis on polystyrene/polyethylene graft polymer supports, it also has been observed that trityl cation is retained on the support. As noted above the retained trityl cation is then available to re-tritylate hydroxyl sites. Such re-tritylation can lead to short sequences or error sequences. As bed volume increases, this problem becomes of greater and greater concern. Since other sites in an oligonucleotide are acid sensitive, i.e. depurination of adenine bases, resorting to larger volumes of acid wash is not always a viable solution to "trityl sticking."

Short sequences are an inherent by product of solid phase oligonucleotide synthesis. As the short sequences are formed they are capped with a capping reagent, normally an acid anhydride, to generate an ester cap. Upon completion of the synthesis and after removal from the solid phase support, the short sequences must be removed from the desired oligonucleotide sequence. To effect final purification of the oligonucleotide, it is important to know the efficiency of coupling of an oligonucleotide synthesis. An estimate of the amount the crude oligonucleotide is necessary for proper loading of the crude oligonucleotide on the purification gel or HPLC column.

Efficiency of coupling of the individual nucleotides to the growing oligonucleotide is normally judged by comparison of yield of the released trityl moieties. This is determined spectrophotometrically, usually at 498 nm, by determining the amount of dimethoxytrityl cation released by acidic treatment of a sample on the support. Thus the efficiency of a synthesis may be compared by comparing the amount of trityl release during the first coupling to that released during the last. If trityl ion is retained on the support, coupling efficiencies of the synthesis conducted on support can not be accurately estimated in the normal manner.

Additionally many synthesis are conducted in a "trityl on" mode. In such synthesis, the trityl group of the 5' terminus nucleotide is retained on the oligonucleotide when the oligonucleotide is release from the solid phase support. The presence of the remaining trityl moiety assist in other procedures conducted post removal from the solid phase support. The presence of this trityl group can retard removal of an oligonucleotide from the bed of the solid phase support. By utilizing copolymers of N-vinylpyrrolidone and acrylamide, "trityl problems" are circumvented.

The above-referenced graft polymers of Bayer and Rapp (U.S. Pat. No. 4,908,405) consist of various crosslinked polystyrene or other polymers that are then converted into a graft polymer with polyoxyethylene chains. For comparison purpose with a polymer of this invention, loading, swelling and barrier layer characteristics of this prior art polystyrene/polyoxyethylene graft polymer and a polymer of the invention have been measured and are presented in the below examples.

The following examples are presented to illustrate this invention. They are not intended to be limiting. In the examples and throughout the present application, percentages are given as weight percent of the monomeric components and crosslinking agent used in the polymerization reaction prior to amine displacement or other functionalization. This convention is used to avoid any possible confusion attendant to the weight percentages which are applicable to a component when displacement or alteration of a function group occurs. In particular, when a chlorinated polymer is formed and subsequently amminated to replace the chlorine functions with amine, the weight percent refers to the polymer components prior to ammination.

Furthermore, the percentages used to describe a particular polymer are not intended to necessarily indicate percentages in the actual polymer or anywhere locally therein. Instead, the convention used indicates the percentage of each monomer from which the polymer is formed with respect to the combined weight of the monomers only. The percentage of crosslinking agent is expressed as a percentage of the total amount of monomers. For example, a crosslinked copolymer prepared with 10 grams of a first monomer, 90 grams of a second monomer, and 1 gram crosslinking agent would, in accordance with this convention be identified as a 10:90 copolymer with 1% crosslinking agent. However, it should be noted that true percent by weight of each component in this example, would be different.

The following examples are illustrative and not meant to be limiting of the present invention.

EXAMPLE 1

Preparation of 10:90 Poly(N-vinyl-2-pyrrolidone-chloromethyl styrene) 1% divinylbenzene Crosslinked Copolymer A suspension of chloromethyl styrene (90 g, Polysciences, Inc., Warrington, Pa.), N-vinyl-2-pyrrolidone (10 g, Polysciences, Inc., Warrington, Pa.) and divinyl benzene (1 g) was stirred in water (80 g) and toluene (50 g) in the presence of a surfactant (6 g) and azobisdimethyl valernitrile catalyst (1 g) under nitrogen at 60°–70° C. in a flask equipped with a condenser until a viscosity increase was noted (48 hrs). Particles were precipitated by the addition of DMF. The particles were washed with toluene and then acetone and air dried under vacuum.

EXAMPLE 2

Preparation of 10:90 Poly (N-vinyl-2-pyrrolidone-aminomethylstyrene) 1% divinylbenzene crosslinking Copolymer The chlorinated styrene copolymer (25 g) from Example 1 was treated with anhydrous ammonia (20 g) in DMF (400 g), first at room temperature and then at 40°–45° C. for 6 days. The particles were washed with hot water (2×) to remove ammonium chloride, followed by acetone and dried under vacuum at 65°–80° C. to give the final polymer in 35% yield based on chloromethyl styrene starting monomer of Example 1.

EXAMPLE 3

Preparation of Other Crosslinked Poly(N-vinyl-2-pyrrolidone-aminomethyl styrene) Copolymers The procedures of Examples 1 and 2 were followed to provide first, chlorinated, crosslinked copolymers and then amine-containing, crosslinked copolymers where the chlorine substitutient is replaced with $NH_2$ through amination. The following poly(N-vinyl-2-pyrrolidone-chloromethylstyrene) copolymers crosslinked with divinyl styrene were prepared:

i. 10% vinyl-2-pyrrolidone, 90% chloromethylstyrene, 4% divinyl styrene;
ii. 10% vinyl-2-pyrrolidone, 90% chloromethylstyrene, 0.2% divinyl styrene;
iii. 50% vinyl-2-pyrrolidone, 50% chloromethylstyrene, 4% divinyl styrene;
iv. 50% vinyl-2-pyrrolidone, 50% chloromethylstyrene, 1% divinyl styrene;
v. 50% vinyl-2-pyrrolidone, 50% chloromethylstyrene, 0.2% divinyl styrene;
vi. 90% vinyl-2-pyrrolidone, 10% chloromethylstyrene, 4% divinyl styrene;
vii. 90% vinyl-2-pyrrolidone, 10% chloromethylstyrene, 1% divinyl styrene; and
viii. 90% vinyl-2-pyrrolidone, 10% chloromethylstyrene, 0.2% divinyl styrene.

Following amination, the crosslinked polymers having free amine functions are produced and isolated.

Analogous reactions may be performed in the alternative using a substituted amine such as methyl amine, ethyl amine or the like to provide substituted amine functionalities on the copolymers. It is preferred to provide the resulting polymers with amine functions having no more than disubstitution. The procedures of Examples 1 and 2 can be modified as needed to accommodate the properties of the monomers and copolymers used and formed. In all cases, such modifications are within the knowledge of persons skilled in the polymer arts.

EXAMPLE 4

Preparation of Poly [N-vinyl-2-pyrrolidone-N-(phthalimidomethyl) acrylamide] Copopolymer Crosslinked with Divinyl Benzene Solution polymerization is carried out generally in the manner of Example 1. Amounts of N-phthalimidomethyl acrylamide (Polysciences, Inc., Warrington, Pa.) varying from 10 to 90 weight percent are admixed with from 10 to 90 weight percent N-vinyl- 2-pyrrolidone (Polysciences, Inc., Warrington, Pa.) and from 0.2 to 5 weight percent divinyl benzene. These are solution polymerized in the presence of a polymerization catalyst. The title polymers are isolated.

EXAMPLE 5

Preparation of Poly [N-vinyl-2-pyrrolidone-N-(aminomethyl)acrylamide] Crosslinked Copolymers The Poly [N-vinyl-2-pyrrolidone-N-(phthalimidomethyl)acrylamide] copolymers from Example 4 are treated with methylhydrazine under anhydrous conditions to give the title polymers having free amine functionalities.

EXAMPLE 6

Preparation of Poly [N-vinyl-2-pyrrolidone-N-(3-aminopropyl) methacrylamide] Crosslinked Copolymers In the manner of Example 1, from 10 to 90 weight percent N-(3-aminopropyl) methacrylamide (Polysciences, Inc., Warrington, Pa.), from 10 to 90 weight percent N-vinyl-2-pyrrolidone (Polysciences, Inc., Warrington, Pa.) and from 0.2 to 5 weight percent (especially about 1 percent) divinyl benzene are solution polymerized to give the title polymers having free amine groups.

EXAMPLE 7

Preparation of Poly [N-vinyl-$\beta$-propiolaotam-N-(3-aminopropyl)methaorylamide] Copolymers In the manner of Example 1, from 10 to 90 weight percent N-(3-aminopropyl) methacrylamide (Polysciences, Inc., Warrington, Pa.), from 10 to 90 weight percent N-vinyl-$\beta$-propiolactam and from 0.2 to 5 weight percent (especially about 1%) divinyl benzene are polymerized to give the title polymers.

EXAMPLE 8

Preparation of Poly [N-vinyl-2-piperidone-N-(3-aminopropyl)methacrylamide] Copolymers In the manner of Example 1, from 10 to 90 weight percent N-(3-aminopropyl) methacrylamide (Polysciences, Inc., Warrington, Pa.), from 10 to 90 weight percent N-vinyl-2-piperidone and from 0.2 to 5 weight percent (especially about 1%) divinyl benzene are polymerized to give the title polymers.

EXAMPLE 9

Preparation of Poly [N-vinyl-$\epsilon$-caprolactam-N-(3-aminopropyl) methacrylamide] copolymers In the manner of Example 1, from 10 to 90 weight percent N-(3-aminopropyl) methacrylamide (Polysciences, Inc., Warrington, Pa.), from 10 to 90 weight percent N-vinyl-$\epsilon$-caprolactam and from 0.2 to 5 weight percent (especially 1%) divinyl benzene are polymerized to give the title polymers.

EXAMPLE 10

Preparation of Poly [N-vinyl-2-piperidone-aminomethylstyrene Copolymers

In the manner of Example 1, from 10 to 90 weight percent chloromethyl styrene (Polysciences, Inc., Warrington, Pa.), from 10 to 90 weight percent N-vinyl-2-piperidone and from 0.2 to 5 weight percent, especially 1%, divinyl benzene are polymerized. The chloromethylstyrene copolymer intermediate is then treated generally in accordance with Example 2 to give the title polymers.

EXAMPLE 11

Swelling Of Polystyrene-polyoxyethylene Graft Copolymer In Various Solvents

Swelling of a polystyrene-polyoxyethylene graft copolymer, TentaGel-resin Amine-NH$_2$ (Rapp Polymere, Tubingen, Germany), which is used for oligomer synthesis, was determined in various solvents. The values were measured by comparing the volume of the swollen resin after equilibrium in the solvent at room temperature to the volume of the dry resin.

Swelling was measured in typical oligonucleotide synthesis solvents. The solvents tested were water (H$_2$O), dichloromethane (DCM), dimethylforamide (DMF), acetonitrile (MeCN) and tetrahydrofuran (THF). Swelling was measured and is shown in Table 1.

TABLE 1

Swelling Factor
Polystyrene/Polyoxyethylene Graft Polymers

| | Solvent | | | | |
|---|---|---|---|---|---|
| | H$_2$O | DCM | DMF | MeCH | THF |
| Vsw/Vdry | 2.5 | 3.0 | 3.2 | 3.0 | 3.4 |

EXAMPLE 12

Swelling Of Poly [N-vinyl-2-pyrrolidone-aminomethlstyrene] Crosslinked Copolymers In Various Solvents Certain poly N-vinylpyrrolidone—polystyrene crosslinked copolymers of this invention were analyzed for their swelling factor utilizing the same protocols as those for the polystyrene polyethylene graft copolymer of Example 11 above. Swelling was measured and is shown in Table 2.

TABLE 2

Swelling Factor
swelling $V_{sw}/V_{dry}$

| | Solvent | | | | |
|---|---|---|---|---|---|
| Polymer | H$_2$O | DCM | DMF | MeCH | THF |
| Ex. 2 | 2.0 | 1.6 | 2.0 | 1.8 | 2.0 |
| Ex. 3 i | 1.6 | 2.0 | 2.2 | 1.8 | 2.2 |
| Ex. 3 ii | 1.3 | 2.0 | 2.0 | 1.8 | 2.2 |
| Ex. 3 iii | 1.2 | 2.0 | 2.0 | 2.4 | 2.0 |
| Ex. 3 iv | 1.4 | 2.0 | 2.0 | 2.0 | 2.1 |
| Ex. 3 v | 1.3 | 2.7 | 2.3 | 2.0 | 2.0 |
| Ex. 3 vi | 1.4 | 2.0 | 1.9 | 2.0 | 1.9 |
| Ex. 3 vii | 1.5 | 2.9 | 2.7 | 2.2 | 2.7 |
| Ex. 3 viii | 2.1 | 3.3 | — | 3.1 | 2.5 |

The data show that overall the crosslinked copolymers of this invention exhibit superior swelling resistance values as compared to the typical polystyrene/polyoxyethylene graft polymer of Example 12. While the values for other polymers used in oligomer synthesis are likely to be different, the present example demonstrates a beneficial trend toward lower swelling values for the copolymers of this invention.

From the data shown, it is apparent that different polymers in accordance with the invention will have different swelling characteristics in different solvents. An appropriate polymer may, thus be selected for the particular solvent system contemplated for use. This ability to tailor the polymers of the invention for particular applications is believed to be highly beneficial.

EXAMPLE 13

Solvent Barrier Layer Studies Of Polystyrene-polyoxyethylene Graft Polymer

NMR was utilized to study polymer-solvent interaction. For these studies acetonitrile was selected as the solvent since acetonitrile is utilized in the nucleotide coupling steps of oligonucleotide synthesis. In these studies both a polystyrene/polyoxyethylene graft polymer of the prior art and a N-vinylpyrrolidone/polystyrene polymer of the invention were studied. By these NMR studies it was shown that in the polystyrene/polyoxyethylene graft polymer of the prior art, acetonitrile is bound in solvent layer. In contrast, in the N-vinyl-2-pyrrolidone/polystyrene polymer of the invention, acetonitrile is not bound in solvent layer.

This study measured the relaxation rate of protons on the polymer as well as the relaxation rate of solvent protons, both free and in the environment of the polymer. By saturating first the protons of the polymer and watching the relaxation of the solvent molecules and then saturating the solvent protons and measuring the relaxation of the polymer molecules, the relaxation rate can be determined. From these relaxation rates, the rate constant can be calculated. NMR studies were preformed on a Varian 400 MHz NMR.

With a polystyrene/polyoxyethylene graft polymer/acetonitrile solvent system, the relaxation rates of bound solvent and polymer protons (the ethylene protons) was essentially equal. This demonstrated that at least on the time scale of the NMR, the solvent was bound to the polymer in a bound layer, that is, on the NMR time scale the solvent molecules appeared fixed to the polymer. The measured relaxation rate of polymer protons was 1.18 sec$^{-1}$ and those of bound solvent also 1.18 sec$^{-1}$. As opposed to this, free solvent molecules had a relaxation rate of 0.2 sec$^{-1}$. The calculated rate constant is thus $K=6\times10^3$ sec$^{-1}$. Rate constants were calculated according to the methods of Led, J. J. and Gesmar, H., *J. Magn. Reson.* 1982, 49:444-463.

EXAMPLE 14

Solvent Barrier Layer Studies Of Poly [N-vinyl-2-pyrrolidone] Copolymer

The same experiment as described in Example 13 was repeated on the poly(N-vinyl-2-pyrrolidone-aminomethylstyrene) copolymer of the invention, the relaxation rate of the polymer protons were found to be different than that of solvent. The polymer protons had a relaxation rate of 5 sec$^{-1}$ whereas the solvent protons had a relaxation rate of 0.6 sec$^{-1}$. The calculated rate constant is then $K>2.5\times10^4$.

While not wishing to be bound by theory, it is believed that the studies of Examples 13 and 14 demonstrate that the dipoles of the polystyrene/polyoxyethylene graft polymer are aligned along the length of the polymer. This allows the solvent to align with the polymer while the dipoles of the solvent align opposite to the dipoles of the polymer to effectively hold the solvent to the surface of the polymer.

It is known that the domain of the NMR measurements are about 4 Angstroms. The calculated rate constants thus indicate that with the poly(N-vinyl-2-pyrrolidone-aminomethylstyrene) copolymer of the invention there is solvent exchange within at least about 4 Angstrom of the surface of the polymer and this solvent exchange is at least 4 times faster than the solvent exchange with the polystyrene/polyoxyethylene graft polymer of the prior art.

Again while not wishing to be bound by theory, from the above studies, it is evident that since solvent is freer to exchange against the surface of the poly(N-vinyl-2-pyrrolidone-aminomethylstyrene) copolymer of the invention compared to solvent exchange with the surface of the polystyrene/polyoxyethylene graft polymer, reagents in that solvent will have freer access to the molecules attached to the polymer of the invention. Thus the rate of reaction of oligomer synthesis on the polymer of the invention will be greater.

EXAMPLE 15

Loading of Poly [N-vinyl-2-pyrrolidone-aminomethylstyrene] Copolymers

Loading of copolymers of the invention was measured by the loading of 5'-O-dimethoxytrityl-N4-benzoyl cytidine-3'-O-p-nitrophenyl succinic acid ester on samples of the copolymers. 5'-O-dimethoxytrityl-N4-benzoyl cytidine-3'-O-p-nitrophenyl succinic acid ester was prepared by dissolving 5'-O-dimethoxytrityl-N-4-benzoyl cytidine (40 g, 1 eq), succinic anhydride (25.6 g, 4 eq) and DMAP (4 g, 0.5 eq) in pyridine (500 ml). The reaction mixture was stirred overnight and then was quenched with 50 ml $H_2O$. The solvent was evaporated under vacuum and the residue suspended in $CH_2Cl_2$, extracted with $H_2O$ (2×), citric acid (1×) and dried over $Na_2SO_4$. The solvent was evaporated under vacuum and the residue together with p-nitrophenol (2 eq) and dicyclohexyl carbodiimide, DCC (2 eq) were dissolved in dioxane (300 ml). The reaction was stirred overnight, the dicyclohexylurea removed by filtration and the solvent evaporated under vacuum. The residue was taken up in $CH_2Cl_2$, extracted with saturated $NaHCO_3$ (1×), $H_2O$ (2×), brine (1×) and dried over $Na_2SO_4$. The solvent was evaporated under vacuum and the residue purified by flash chromatography. The column was washed with $CH_2Cl_2$ (1 liter) and the product eluted with 1% MeOH/$CH_2Cl_2$. Polymer loading was determined using a trityl assay measuring absorbance at 498 nm. Results are shown in Table 3.

TABLE 3

| polymer | Loading loading ($\mu$mol/g) |
|---|---|
| Ex. 2 | 20 |
| Ex. 3 i | 70 |
| Ex. 3 ii | 12 |
| Ex. 3 iii | 55 |
| Ex. 3 iv | 113 |
| Ex. 3 v | 41 |
| Ex. 3 vi | 24 |
| Ex. 3 vii | 282 |
| Ex. 3 viii | 168 |

The foregoing data compare favorably with the loading data for commonly used oligomer synthesis resins.

What is claimed is:

1. A solid support for oligomer synthesis having free amine functionalities comprising a polymerized blend of:
   from about 10 to about 90 percent by weight of N-vinyl lactam;
   from about 10 to about 90 percent by weight of ethylenically unsaturated monomer having at least one amine or amine-displaceable functionality, said ethylenically unsaturated monomer comprising an amino or alkylamino moiety linked to styrene via a $C_1$–$C_{10}$ alkyl moiety; and from about 0.01 to about 5 percent by weight of di- or polyfunctional crosslinking agent.

2. The solid support of claim 1 wherein the N-vinyl lactam is present in an amount of from about 45 to about 90 percent by weight; the ethylenically unsaturated monomer is present in an amount of from about 10 to about 55 percent by weight; and the crosslinking agent is present in an amount of from about 0.2 to about 1.5 percent by weight.

3. The solid support of claim 1 wherein the N-vinyl lactam is present in an amount of from about 10 to about 45 percent by weight; the ethylenically unsaturated monomer is present in an amount of from about 55 to about 90 percent by weight; and the crosslinking agent is present in an amount of from about i to about 4 percent by weight.

4. The solid support of claim 1 comprising a polymerized blend of: about 90 percent by weight of N-vinyl lactam; about 10 percent by weight of ethylenically unsaturated monomer; and about 1 percent by weight of crosslinking agent.

5. The solid support of claim 1 wherein the ethylenically unsaturated monomer comprises a primary amine, said primary amine being the alkylamino moiety methylamino or ethylamino.

6. The solid support of claim 1 wherein said ethylenically unsaturated monomer is a haloalkylstyrene.

7. The solid support of claim 1 wherein said ethylenically unsaturated monomer is a chloromethylstyrene.

8. A solid support for oligomer synthesis having free amine functionalities comprising a polymerized blend of:

from about 10 to about 90 percent by weight of N-vinyl lactam;

from about 10 to about 90 percent by weight of ethylenically unsaturated monomer having at least one amine or amine-displaceable functionality; and from about 0.01 to about 5 percent by weight of di- or polyfunctional crosslinking agent, said di- or polyfunctional crosslinking agent being divinylbenzene or a divinyl ether.

9. The solid support of claim 1 wherein the N-vinyllactam is N-vinylpropiolactam, N-vinyl-2-pyrrolidone, N-vinyl-2-piperidone or N-vinylcaprolactam.

10. The solid support of claim 1 wherein said N-vinyllactam is N-vinyl-2-pyrrolidone.

11. A solid support for oligomer synthesis comprising a polymerized blend of:

from about 10 to about 90 percent by weight of N-vinyl pyrrolidone;

from about 10 to about 90 percent by weight of one of alkylaminoalkylstyrene, aminoalkylstyrene, vinylalkylamine or vinylalkyl(alkylamine); and from 0.02 to about 4 percent by weight of di- or polyfunctional crosslinking agent.

12. A solid support for oligomer synthesis comprising a polymerized blend of:

from about 10 to about 90 percent by weight of N-vinyl pyrrolidone;

from about 10 to about 90 percent by weight of one of $C_1$–$C_{10}$-alkylamino-$C_1$–$C_{10}$-alkylstyrene, amino-$C_1$–$C_{10}$-alkylstyrene, vinyl-$C_1$–$C_{10}$-alkylamine or vinyl-$C_1$–$C_{10}$-alkyl ($C_1$–$C_{10}$-alkylamine); and from 0.01 to about 5 percent by weight di- or polyfunctional crosslinking agent.

13. A solid support for oligomer synthesis comprising a polymerized blend of:

from about 10 to about 90 percent by weight of N-vinyl pyrrolidone; and from about 10 to about 90 percent by weight of N-phthalimidoalkyl acrylamide;

and from 0.01 to about 5 percent by weight crosslinking agent.

14. The solid support of claim 13 wherein the crosslinking agent is divinylbenzene.

15. A solid support for oligomer synthesis comprising:

from about 10 to about 90 percent by weight of N-vinylpyrrolidone;

from about 10 to about 90 percent by weight of aminomethyl acrylamide; and from about 0.01 to about 5 percent by weight of a divinylbenzene crosslinking agent.

16. A solid support for oligomer synthesis comprising a first polymer comprising a polymerized blend of:

from about 10 to about 90 percent by weight of N-vinyl pyrrolidone;

from about 10 to about 90 percent by weight of chloromethyl styrene; and from about 0.01 to about 5 percent by weight of a crosslinking agent; said first polymer being reacted with an amine to displace the chloride functionalities to provide said solid support having free amine groups.

17. The solid support of claim 16 wherein the amine is ammonia.

18. The solid support of claim 16 wherein the amine is methylamine.

19. The solid support of claim 16 wherein the crosslinking agent is divinylbenzene.

20. The solid support of claim 16 comprising from about 5 to about 15 percent by weight N-vinylpyrrolidone, from about 85 to about 95 percent chloromethylstyrene and from about 1 to about 4 percent by weight divinylstyrene.

* * * * *